Dec. 24, 1957 W. R. OPPEN 2,817,770
POWER TRANSFER CIRCUIT
Filed April 17, 1956
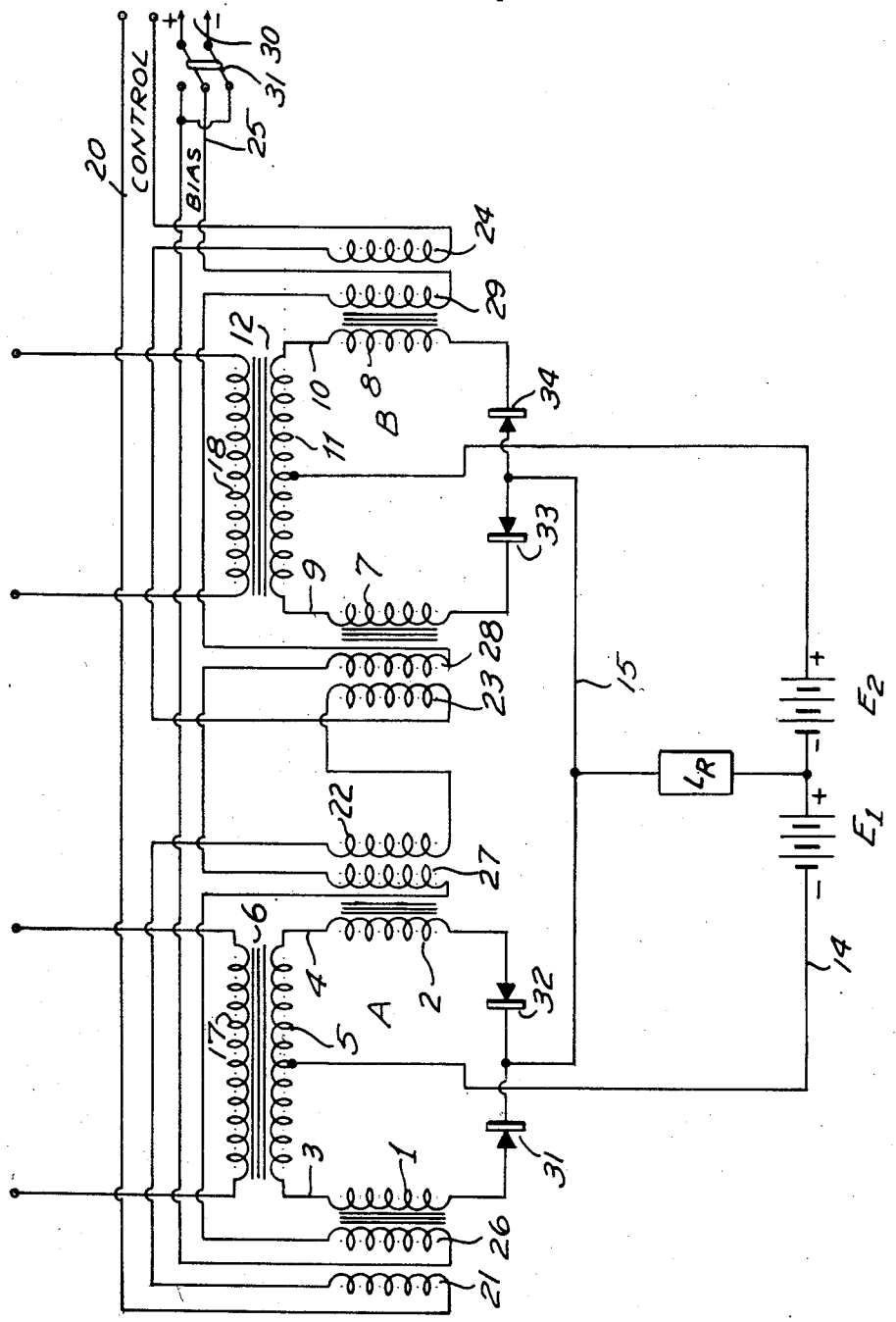
INVENTOR.
WALTER R. OPPEN
BY
ATTORNEY

United States Patent Office 2,817,770
Patented Dec. 24, 1957

2,817,770
POWER TRANSFER CIRCUIT

Walter R. Oppen, Plandome, N. Y., assignor to Sperry Rand Corporation, Ford Instrument Company Division, Long Island City, N. Y., a corporation of Delaware Application April 17, 1956, Serial No. 578,712

4 Claims. (Cl. 307—51)

This invention relates to a circuit for delivering power selectively from two power sources at maximum efficiency.

The invention contemplates the provision of separate A.-C. power sources in permanent load connection and arranged to make available to the load, rectified currents of opposing polarity. The rectified current may be supplied with only one of the two sources in operation depending on the load polarity desired, but preferably, and as shown, the load may be operated with both sources on, the desired polarity being obtained by biasing means. Under either circuit arrangement, however, the problem arises as to how to prevent the power sources from partially shunting the load particularly after initial operation when their reactances have dropped. Generally, the solution is to isolate the sources by means of a third potential in the line connecting the sources which is substantially equal to the voltage drop across the load when full power is delivered to the line, thus effectively precluding current flow from one source to the other. Full wave rectification is provided in the line to insure maximum transfer of power to the load.

An object of the invention is to provide a power transfer circuit capable of delivering maximum power from separate sources to a load.

Another object of the invention is to provide a circuit which is adapted to deliver maximum current of selected polarity to a load without the use of circuit-breaking devices or unidirectional switches.

Other objects and advantages of the invention may be apparent on reading the detailed description in conjunction with the accompanying drawing, in which the figure represents schematically the improved power transfer circuit.

Referring to the figure a load $L_R$ is permanently connected across two magnetic amplifier power sources A and B, which are rectified to supply current of opposing polarity thereto. The source A includes a pair of anode windings 1 and 2 which are arranged on magnetic cores and connected by parallel branches 3 and 4 to either side of secondary 5 of transformer 6. Similarly, source B includes a pair of anode windings 7 and 8 arranged on separate cores and connected by parallel branches 9 and 10 to secondary winding 11 of transformer 12. A line is disposed across the anode windings of the two sources having a lead 14 joining the center tap of the secondary winding 5 to the center tap of the secondary winding 11 and a lead 15 which connects the juncture of the branches in the two power sources opposite the secondary windings. The transformers 6 and 12 have separate primaries 17 and 18, respectively. If desired, the transformer secondaries may be coupled to a single primary.

A control circuit 20 for the magnetic amplifiers includes winding 21 on the magnetic core in branch 3, winding 22 on the core in branch 4, winding 23 on the core in branch 9 and winding 24 on the core in branch 10. The control windings are wound so as to be poled in the same direction.

A bias circuit 25 includes a winding 26 disposed on the magnetic core in branch 3, winding 27 on the core in branch 4, winding 28 on the core in branch 9 and winding 29 on the core in branch 10. The bias windings 26 and 27 for the source A are wound oppositely to the windings 28 and 29 in the source B. The line 25 is selectively connected to the positive and negative poles of a D.-C. source 30 by means of double pole switch 31 to control the relative output of the two sources as desired.

A load $L_R$ is connected to lead 14 and across the line to the other lead 15. Half wave rectifiers 31 and 32 are provided in the branches 3 and 4, respectively, being poled in the direction of one side of load $L_R$. Half wave rectifiers 33 and 34 in the branches 9 and 10 are poled to the other side of the load. Hence, the source A and the source B are adapted to supply full wave rectified, load current with opposite polarity. The polarity of the load circuit is selective depending on the relative magnitudes of the voltages provided by the the power sources as determined by the reactances of the anode windings which in turn are governed by the polarity of the biasing circuit 25.

In order that maximum power may be transferred to the load, an auxiliary potential source $E_1$ is provided in lead 14 on one side of the load connection in series with anode windings 1 and 2 and a potential source $E_2$ is provided in lead 14 on the other side of the load connection and in series with anode windings 7 and 8. As shown in the figure these auxiliary potential sources are batteries but the potential may be supplied by a rectified power supply or a double commutator generator. Current from the auxiliary sources is prevented from flowing through the magnetic amplifiers due to the blocking action of the rectifiers. The magnitude of the auxiliary potential is approximately equal to the voltage across the load when full power is being delivered by the magnetic amplifiers to the load. The connection points for the leads 14 and 15 at each of the power sources are placed at substantially the same potential when the voltage drop across the load is equal to the potential supplied by each of the sources. Hence, power drain across the line between these connection points is effectively minimized. From a power standpoint this may be considered a 50% efficient transfer of power to the load. The isolation of the power sources is thus achieved without provision for removing one of the sources from the load circuit as by a circuit breaking device or switch.

It is understood that the invention is not confined to the precise circuit arrangement which has been shown and described, and that the preferred embodiment may be modified as requirements demand without departing from the scope of the invention as defined by the appended claims.

I claim:

1. A power transfer circuit comprising two A.-C. power sources, a line having a lead connecting one side of one of said power sources to a corresponding side of the second source and a second lead connecting the other side of said one source to the corresponding side of said second source, each of said sources having a rectifier, said rectifiers being oppositely poled with respect to said line connections, means for selectively controlling the output amplitude of said power sources, an auxiliary potential source in the line and connected in series with each amplifier, said rectifiers being also poled so as to prevent current produced by said potential sources from passing to said line, the magnitude of each potential source being approximately equal to the magnitude of the voltage across the power sources when full power is being delivered by the power sources to the line, whereby said circuit is adapted to deliver current of selected polarity and with minimum power loss to a load connected to a point between said potential sources and to the other side of the line.

2. A power transfer circuit as claimed in claim 1 wherein said A.-C. power sources have means for delivering full wave rectified current to said line.

3. A power transfer circuit comprising a pair of magnetic amplifiers, a line having one lead connecting one side of the first amplifier to one side of the second amplifier and the other lead connecting the other sides of each amplifier whereby a load connected across the line is similarly connected across both amplifiers, means in said line for causing the amplifiers to deliver full wave rectified current of opposing polarity to the line, and an auxiliary potential source in the line and connected in series with each amplifier, said rectifying means being poled so as to prevent current from the auxiliary potential sources from passing to said amplifiers, the magnitude of each potential source being approximately equal to the magnitude of the voltage across the line when full power is being delivered by the amplifiers to the line.

4. A power transfer circuit comprising two power sources, each source having a pair of branch leads with an anode winding arranged on a magnetic core disposed in each lead, a control circuit having a control winding on each core, a biasing circuit having a bias winding on each core, said control and bias windings being arranged to differentially condition the magnetic cores in each power source, a source of alternating current connected to each anode winding, a line having leads connecting corresponding junction points of the branch leads, a load connection across the line, an auxiliary potential source disposed in the line on each side of the load connection and rectifiers in each branch lead, the rectifiers in one pair of branch leads being poled in the direction of one side of the load and the rectifiers in the other pair of branch leads being poled in the direction of the other side of the load, the magnitude of each potential source being approximately equal to the voltage across the load when full power is delivered by the power sources to the load.

No references cited.